July 22, 1924.  
P. MUELLER ET AL  
NOSLIP FLANGE  
Filed May 25, 1923
1,502,154
2 Sheets-Sheet 1
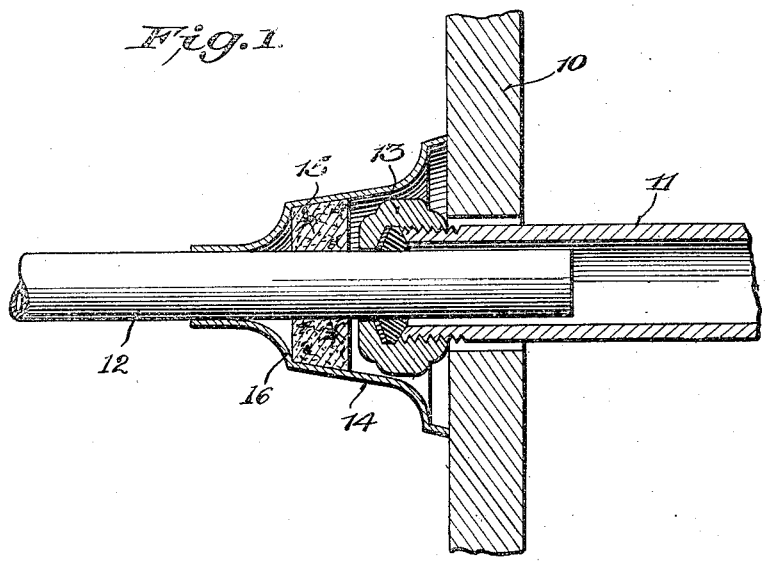
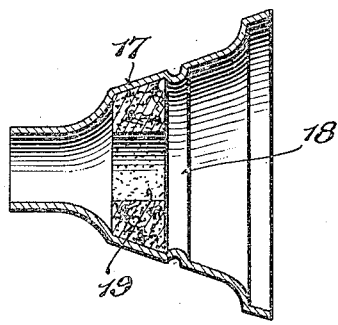
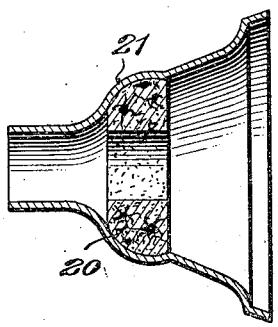
Inventors  
Philip Mueller,  
Anton C. Schuermann,

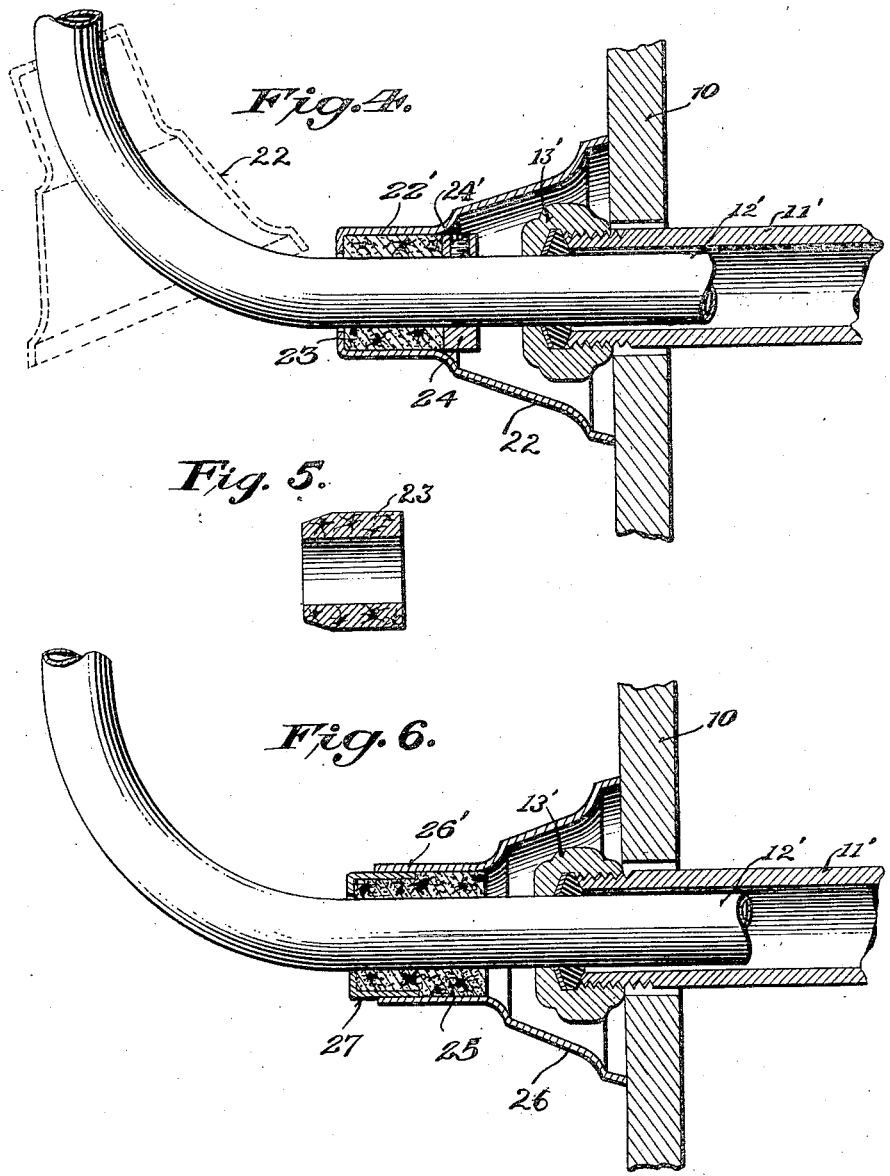

Patented July 22, 1924.

1,502,154

UNITED STATES PATENT OFFICE.

PHILIP MUELLER AND ANTON C. SCHUERMANN, OF DECATUR, ILLINOIS, ASSIGNORS TO ADOLPH MUELLER, TRUSTEE, OF DECATUR, ILLINOIS.

NOSLIP FLANGE.

Application filed May 25, 1923. Serial No. 641,425.

*To all whom it may concern:*

Be it known that we, PHILIP MUELLER and ANTON C. SCHUERMANN, citizens of the United States, residing at Decatur, in the county of Macon and State of Illinois, have invented new and useful Improvements in Noslip Flanges, of which the following is a specification.

The present invention relates to no-slip flanges, such as are used in connection with water, steam, gas pipes and the like, or wherever, in fitting up pipes and fixtures it is desirable or necessary to use flanges or escutcheons to finish and cover the ceiling, wall, or panel apertures through which the pipes pass.

Such devices are very generally used in plumbing work, and it is in connection with such work that we shall describe the present development.

The present invention has for its object to provide a no-slip flange or escutcheon with a friction member which, without the use of extraneous locking means, will hold the escutcheon in any desired position on the pipe or fitting with which it is used, in which position it will maintain itself indefinitely, thus doing away with the expense of locking screws, nuts, and like devices for holding the flange.

Broadly considered, the idea of providing a friction device for escutcheons of this kind is old, this having been contemplated by Schuermann in his Patent No. 1,080,520, dated December 2, 1913, where he shows a no-slip flange provided with a packing ring of fibrous material or rubber, the construction being such that this ring contacted with the pipe on which the escutcheon was placed and theoretically was intended to hold it against displacement. The ring of Schuermann has merit, but in actual practice it has been found that there are certain objections to the fibrous ring or a ring formed of rubber. The objection to the fibrous ring is that it absorbs moisture and swells, its material is subject to disintegration and change, and it does not maintain its form in use, it having been found necessary to back that ring on its free edge, as shown in Fig. 2 of the Schuermann drawing, with an independent metal flange or ring to keep it in proper shape and maintain it in good gripping condition. Rubber, which is mentioned by Schuermann, has, of course, qualities which make it somewhat unsuitable for this purpose, as it deteriorates badly with age; it will stick and corrode upon metal after it has been in place any appreciable length of time, and it cannot be slipped or moved easily upon the pipe to bring it into proper adjusted position.

Furthermore, in the patent referred to, the fibrous material or rubber was encased exteriorly through substantially its entire length in a metal casing which prevented or at least reduced the frictional engagement of the collar with the escutcheon.

It is with a view of improving on the development of Schuermann that we have devised the present no-slip flange, adopting a material which is inherently much better fitted to secure the results than the fibrous or rubber washers heretofore used, certain mechanical features in the make-up of the no-slip flange herein disclosed being involved also, which tend to improve and better devices of this character.

In order that the invention may be clear to those skilled in the art, we have shown in the accompanying drawings several embodiments of the invention, and in said drawings:

Fig. 1 is a sectional view of a panel or support with pipes passing through an opening therein, this showing being conventional and merely illustrative of the application of the invention, with an escutcheon or canopy for covering the joint and panel opening, mounted on one of the pipes.

Fig. 2 is a sectional view of an escutcheon and friction ring to show one method of securing the ring in place.

Fig. 3 is a similar view showing another form of escutcheon with the friction ring locked in place.

Fig. 4 is a sectional view of a panel, pipe, and canopy, with a slightly different form of ring.

Fig. 5 is a sectional view of the friction ring shown in Fig. 4.

Fig. 6 is a sectional view, similar to Fig. 4, showing still another form of ring.

Referring to the drawings by numbers, like numbers indicating like parts in the several views, 10 indicates a support through which the pipes pass and to which they are secured.

Passing through a suitable aperture in the support 10 are the pipes or other fixtures, the example shown in the present instance being of two pipes 11 and 12, one telescoping within the other with any suitable coupling or joint 13. It will be understood that the showing, so far as the pipe assembly and support is concerned, is purely conventional, as the no-slip flange or escutcheon which will now be described, may be utilized, with various pipes, connections, and fixtures, by merely changing its design and make-up to conform to the particular fixture with which it is used.

As is well known, it is desirable to finish such assembled fixtures by means of a flange or escutcheon such as 14, and such finishing flanges are ordinarily so disposed as to cover the joint and the opening in panel, ceiling, or other support through which the pipes pass. The flanges 14 are ordinarily provided with a flaring base which seats against the wall or panel 10, as shown in Fig. 1, and is provided with a forward portion which may be curved, fluted or otherwise suitably ornamented, and at its extreme forward end is tapered down to the diameter of the pipe, as shown, so as to give a pleasing finish to the work. The problem of maintaining such escutcheons in their proper position has always been one which has occasioned some difficulty for these escutcheons or flanges must be maintained in proper position lengthwise of the pipe and also so supported that when mounted on a horizontal pipe they will not fall and gap, but will seat closely against the panel or vertical wall of the support, maintaining always the position shown in Fig. 1. These escutcheons are spun from metal and consequently have but little body to support the flange, so that, unless a more substantial support is given, they are likely to be bent and twisted in use. It is desirable, furthermore, that the support for these flanges or escutcheons be disposed at a point which will permit the base to be properly flared and the tip to be properly narrowed to the diameter of the pipe so that a smooth, close, and pleasing finish appears at both ends of the escutcheons.

We accomplish that result, in the present instance, by locating within the flange at a point between its ends, so as not to interfere either with the flared base or the narrowed, closely fitting tip, a friction element 15, which is formed of cork preferably, since this material has a fixed character, does not deteriorate appreciably, is non-absorbent and therefore not attacked by water, and is not corrosive when in contact with metal. Its coefficient of friction is sufficient when given a close fit to a pipe, such as 12, to hold the flange in the position in which it is placed and maintain it in proper relation to the pipe and support, and yet, owing to its non-corrosive character, it will not stick to the pipe, but may be readily removed even after it has been in position for a considerable length of time.

This friction ring 15 of cork will be given an extended bearing on the pipe so that it will sustain the flange against movement either longitudinally of the pipe or in lines transverse thereto. As shown in Fig. 1, it is located within the bulge of the flange, the wall of which, in that example, is slightly inclined toward its tip, so that the ring 15 will be forced forwardly and compressed within the bulge of the flange, bearing against the inwardly, curved wall 16 of the tip, which serves as an abutment and centers the ring 15 relative to the pipe.

The ring will be of larger diameter than the flange interior, so that considerable compression of the ring will be necessary to force it to its seat. This ensures proper frictional engagement of the ring and flange, and, furthermore, constricts the ring so as to cause its bore to hug closely the pipe on which the assembled escutcheon and ring are mounted. This results in a very stable mounting of the flange and its maintenance in any position of adjustment.

In Fig. 2 a construction is shown in which the ring 17 is locked within the flange or escutcheon by forcing it past the projection 18 into its seat so as to hold it firmly in place, the compression of the ring as it is forced to its seat, both in this form and in the form shown in Fig. 1, within the walls of the flange, tending to give a grip to the bore 19 of the ring so that it will be held firmly upon the pipe.

In Fig. 3, the ring 20 is held within a roll or swell 21 formed in the wall of the flange and engaging the ring in such fashion as to lock it firmly in place and give the necessary constriction to it to ensure a good gripping action.

In the modified form of the invention illustrated in Figures 4 and 5, the escutcheon is particularly adapted for use in connection with a supply pipe having a bend near the wall through which it projects, the supply pipe 12' being arranged to telescope within the service pipe 11' and secured thereto by the packing nut 13'. The escutcheon 22 is preferably formed with a reduced chamber 22' at its rear end which receives the friction ring 23. The ring 23 is suitably spaced from the wall by means of a slidable collar 24, which is adjustably secured to the supply pipe 12' by the set screw 24'. The installation is set up by placing the escutcheon 22, together with the friction ring 23, and the collar 24, on the pipe 12' in the order mentioned, and then inserting the supply pipe 12' into the opening in the service pipe 11'. The escutcheon 22 is then slid back over the bend of the pipe 12', as indicated in dotted lines in Fig. 4, so as to allow sufficient space for the insertion of any suitable tool to tightly set up the nut 13' on the service pipe 11'. After the packing nut has been secured to the supply pipe, the escutcheon 22, together with the friction ring 23, and the collar 24, are slid back towards the wall 10, the friction ring entering the chamber 22 in the manner as previously set forth. As the escutcheon is moved towards the wall, the friction ring 23 will be forced back into the chamber 22 by the fixed collar 24. Preferably, the friction ring 23 is slightly tapered at its rear end as shown in Fig. 5, so as to facilitate its entrance into the chamber 22' of the escutcheon. It will be seen that by reason of the tapered end of the ring 23, that when the escutcheon is set up, this tapered end will be expanded under pressure so as to compactly fill the chamber 22 as shown in Fig. 4. The ring 23, is of greater length before being placed in the chamber, in order to afford a sufficient amount of flexible material to fill the chamber and wedge tightly therein upon being expanded. When the parts are set up the ring 23 not only provides a water tight connection, but will also tend to maintain the escutcheon in proper position with respect to the supply pipe.

The form of the invention shown in Fig. 6 is very much similar in construction to that disclosed in Fig. 4, with the exception that the friction ring 25 is mounted on the supply pipe 12' so as to be in telescopic relation with the escutcheon 26. The reduced cylindrical portion 26' of the escutcheon being open at its rear end so as to receive the flange cap 27 which passes therethrough and retains the rear end of the ring in position. In setting up the installation, the escutcheon is placed on the supply pipe 12' and slid back over the bend in the same manner as shown in Fig. 4. The metal cap 27 and the friction ring 25, will then be placed on the supply pipe in the order mentioned, and the friction ring clamped to the pipe by forcing the rear portion of the ring into the cap 27. After the packing nut 13' is set up, the escutcheon 26 may be moved forward over the cap 27 and into engagement with the wall 10, thus providing a neat and attractive appearance to the pipe connection as shown.

By the use of this assembly, a very efficient and ornamental no-slip flange is provided; one which will maintain its position in use, and will not deteriorate in time so as to destroy its efficiency; the cork of which the ring is made, being, as stated, unaffected by moisture and non-corrosive so that it does not break down in use and does not adhere to the pipes. Furthermore, the character of the material is such that it will maintain always its form without the necessity of extraneous means being employed to keep it in a compact and proper gripping condition.

It is to be understood that the forms of the invention herewith disclosed are merely illustrative, and in no sense restrictive, and that the invention is susceptible to such changes as fall within the purview of one skilled in the art, and the scope of the appended claims.

We claim:

1. A no-slip flange comprising a hollow escutcheon having a flaring base and a reduced tip, and a friction ring of cork inserted in the bore of said escutcheon under compression to frictionally lock it to the wall thereof and constrict its pipe engaging orifice.

2. A no-slip flange comprising a hollow escutcheon having a flaring base, a reduced tip, and an inwardly projected protuberance between the base and tip; and a friction ring of cork inserted in the bore of said escutcheon under compression and in engagement with said protuberance to frictionally and positively lock it to the wall of said escutcheon and constrict its pipe engaging orifice.

3. A no-slip flange comprising a hollow escutcheon having a flaring base, a reduced tip, and an inwardly projected annular protuberance between the base and tip; and a friction ring of cork inserted in the bore of said escutcheon under compression and in engagement with said annular protuberance to frictionally and positively lock it to the wall of said escutcheon and constrict its pipe engaging orifice.

4. A no-slip flange comprising a hollow escutcheon, a friction ring inserted in the bore of said escutcheon under compression to frictionally lock it to the wall thereof and constrict its pipe engaging orifice, said ring having an extended pipe engaging surface to insure proper frictional grip to maintain the escutcheon in position and to prevent tilting of the escutcheon.

5. A no-slip flange comprising a hollow escutcheon having a protuberance in its wall between its ends, and a friction ring inserted in the bore of said escutcheon under compression and in engagement with said protuberance to frictionally and positively lock it in the escutcheon and constrict its pipe engaging orifice.

6. A no-slip flange comprising a hollow escutcheon having an annular protuberance in its wall between its ends, and a friction ring inserted in the bore of said escutcheon under compression and in engagement with said annular protuberance to frictionally and positively lock it in the escutcheon and constrict its pipe engaging orifice.

7. A no-slip flange comprising a hollow escutcheon having an inwardly projecting annular rib in its wall between its ends, and a friction ring inserted in the bore of said escutcheon under compression and in engagement with said inwardly projecting annular rib to frictionally and positively lock it in the escutcheon and constrict its pipe engaging orifice.

8. A no-slip flange comprising a hollow escutcheon, a ring of non-corrodible material frictionally engaging the bore of said escutcheon, and laterally offset means in the wall of the escutcheon between its ends engaging said ring for positively locking the ring against longitudinal movement in the escutcheon.

In testimony whereof we have hereunto set our hands.

PHILIP MUELLER.
ANTON C. SCHUERMANN.